United States Patent
Yu

(10) Patent No.: US 8,418,880 B2
(45) Date of Patent: Apr. 16, 2013

(54) PROBE COVER DISPENSER

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 600 days.

(21) Appl. No.: 12/621,645

(22) Filed: Nov. 19, 2009

(65) Prior Publication Data

US 2010/0133291 A1 Jun. 3, 2010

Related U.S. Application Data

(60) Provisional application No. 61/116,256, filed on Nov. 19, 2008.

(51) Int. Cl.
*A47F 1/00* (2006.01)
*G01K 1/08* (2006.01)

(52) U.S. Cl.
USPC ............. 221/97; 221/221; 221/236; 221/279; 221/282; 221/289; 221/197; 221/191; 221/6; 374/209; 206/438

(58) Field of Classification Search .................. 221/221, 221/236, 97, 279, 282, 289, 197, 191, 6; 374/209; 206/438
See application file for complete search history.

(56) References Cited

U.S. PATENT DOCUMENTS

| | | | | |
|---|---|---|---|---|
| 1,028,458 | A | * | 6/1912 | Hassmann .................... 221/152 |
| 2,407,968 | A | * | 9/1946 | Von Stoeser .................... 221/11 |
| 2,834,511 | A | * | 5/1958 | Booth ........................... 221/116 |
| 3,415,416 | A | * | 12/1968 | Broersma et al. ............. 221/221 |
| 3,418,786 | A | * | 12/1968 | Christine et al. ................ 53/282 |
| 3,442,422 | A | * | 5/1969 | Neidig ............................ 221/94 |
| 3,771,691 | A | * | 11/1973 | Rockola ......................... 221/11 |
| 5,613,345 | A | * | 3/1997 | Saito et al. ................... 53/266.1 |
| 6,382,470 | B1 | * | 5/2002 | Hu et al. ....................... 222/203 |
| 6,550,638 | B1 | * | 4/2003 | Mochida ....................... 221/124 |
| 2001/0015766 | A1 | * | 8/2001 | Marchesini ................... 348/373 |
| 2004/0015766 | A1 | * | 1/2004 | Toyama et al. ............... 714/752 |
| 2010/0032447 | A1 | * | 2/2010 | Yu et al. ........................ 221/197 |
| 2011/0299568 | A1 | * | 12/2011 | Huang et al. .................. 374/209 |

* cited by examiner

*Primary Examiner* — Gene O. Crawford
*Assistant Examiner* — Rakesh Kumar
(74) *Attorney, Agent, or Firm* — McClure, Qualey & Rodack, LLP

(57) ABSTRACT

An exemplary embodiment of a probe cover dispenser includes a storage member for accommodating stacked probe covers and a retaining unit with a pair of supporting arms for holding or releasing one of the stacked probe covers. A slide connects the retaining unit. A linking rod with a protrusion portion and a recess portion connects the slidable access member. The linking rod is moved upwardly or downwardly and the protrusion portion or the recess portion is moved to a position corresponding to the slide such that a force is applied to push or pull the supporting arms to release or hold the one of the stacked probe covers in the storage member, while the slidable access member is moved upwardly or downwardly.

9 Claims, 11 Drawing Sheets

PROBE COVER DISPENSER

CROSS-REFERENCE TO RELATED APPLICATIONS

This application claims the benefit of U.S. Provisional Application No. 61/116,256, filed Nov. 19, 2008, the subject matter of which is incorporated herein by reference.

BACKGROUND OF THE INVENTION

The invention relates to the field of probe cover dispensers. More particularly, the invention relates to the field of probe cover dispensers for not exposing the probe cover to touch the body of the user.

The use of ear thermometers is known in the prior art. By way of example, most commercially available ear thermometers are designed to work with disposable probe covers. Most of the disposable probe covers cover the end of the probe and a different probe cover is used for each patient to minimize the risk of spreading disease and also promote cleanliness.

FIG. 1 shows an example probe cover dispenser including a tray 10 designed a block 30 to accept and dispense a probe cover 50. In this example, the probe cover 50 is inserted into a rectangular tray opening 20 defined by tray 10, with the probe cover 50 facing downward into the tray.

To attach an individual probe cover 50 to probe 70 for insertion of probe cover 50 into the ear canal of a user, the user may insert probe 70 into opening 20. The user then pushes probe 70 downwardly into probe cover 50 deforming and stretching the probe cover 50 to provide a tight frictional, high surface tension fit between the probe cover and the probe. The advantage of using the dispensing tray 10 shown in FIG. 1 is that it allows a nurse to very rapidly cover probe 70 with a probe cover 50 without having to ever touch or otherwise contact the outer probe cover surface that is to come into contact with the patient.

However, the aforementioned tray 10 may expose probe covers 50 for a long time such that the covers itself become contaminated before use.

Referring now to FIG. 2, a cutaway, perspective view of the dispenser 100 with a body 120 is presented. The dispenser has a probe cover chamber 140 within which the stack of probe covers is stored. At the top of the chamber 140 is a chamber spring 200. The spring 200 is used to bias the stack of probe covers towards a slide 160 located at the bottom of the chamber 140. The spring 200 is coupled to a pressure plate 180 which rests against the top probe cover in the stack. Also shown in FIG. 5 is the slide 220 in its relaxed position. Mounted to or formed as part of the slide is a spring block for engaging a slide spring mounted to the body 120 of the dispenser. The spring biases the slide 220 into the relaxed position where the aperture 240 of the slide 220 lies outside the chamber 140. The aperture 240 is formed into the slide 220 and its opening and depth are of sizes to accept the probe which the dispenser services.

The described dispenser may not easily to store a probe cover and keep it there to use later by a single hand of the user.

Based on the above, there is a need for medical instrumentation which is uncomplicated in its design and method of operation and which is specifically capable of being used by a single hand.

SUMMARY OF THE INVENTION

An exemplary embodiment of the present invention overcomes the above-described problems by providing a probe cover dispenser, which includes a storage member for accommodating stacked probe covers and a retaining unit with a pair of supporting arms for holding or releasing one of the stacked probe covers. A slide connects the retaining unit. A linking rod with a protrusion portion and a recess portion connects the slidable access member. The linking rod is moved upwardly or downwardly and the protrusion portion or the recess portion is moved to a position corresponding to the slide such that a force is applied to push or pull the supporting arms to release or hold the one of the stacked probe covers in the storage member, while the slidable access member is moved upwardly or downwardly.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Various aspects of the system and method of the present invention will be described, and for purposes of explanation, specific configurations and details are set forth in order to provide a thorough understanding of the present invention. However, it will be apparent to one skilled in the art that the present invention may be practiced without these specific details. Furthermore, well known features have been omitted or simplified in order to prevent obscuring the present invention.

Figure 1:
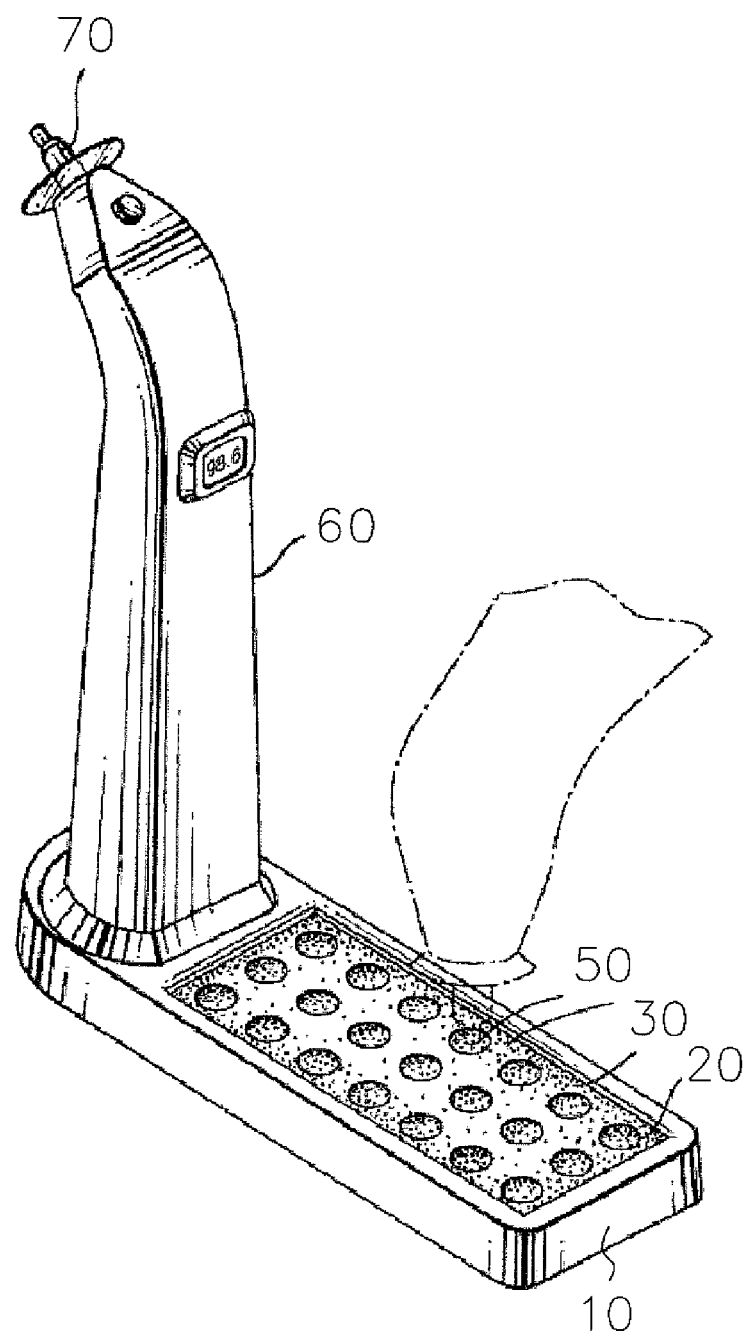
FIGS. 1-2 show some examples of prior art of probe cover dispenser designs.
Figure 2:
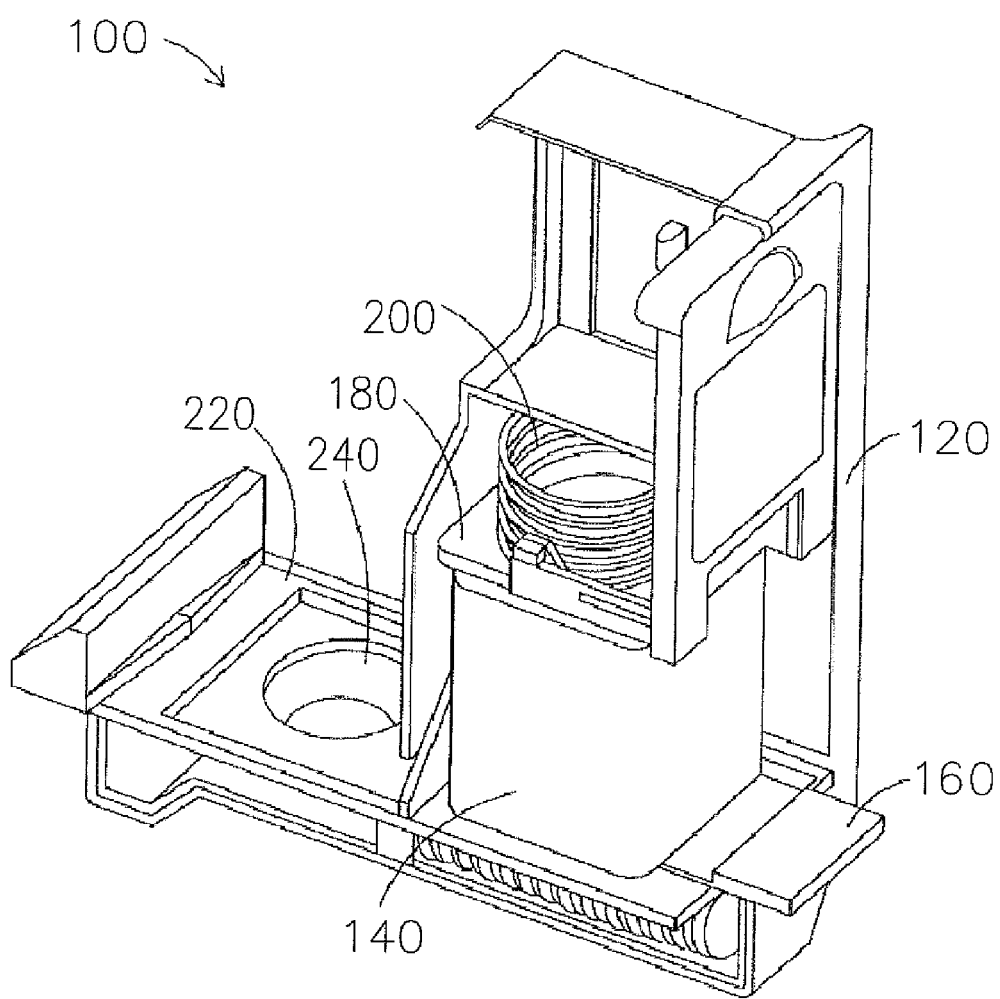
Figure 3:
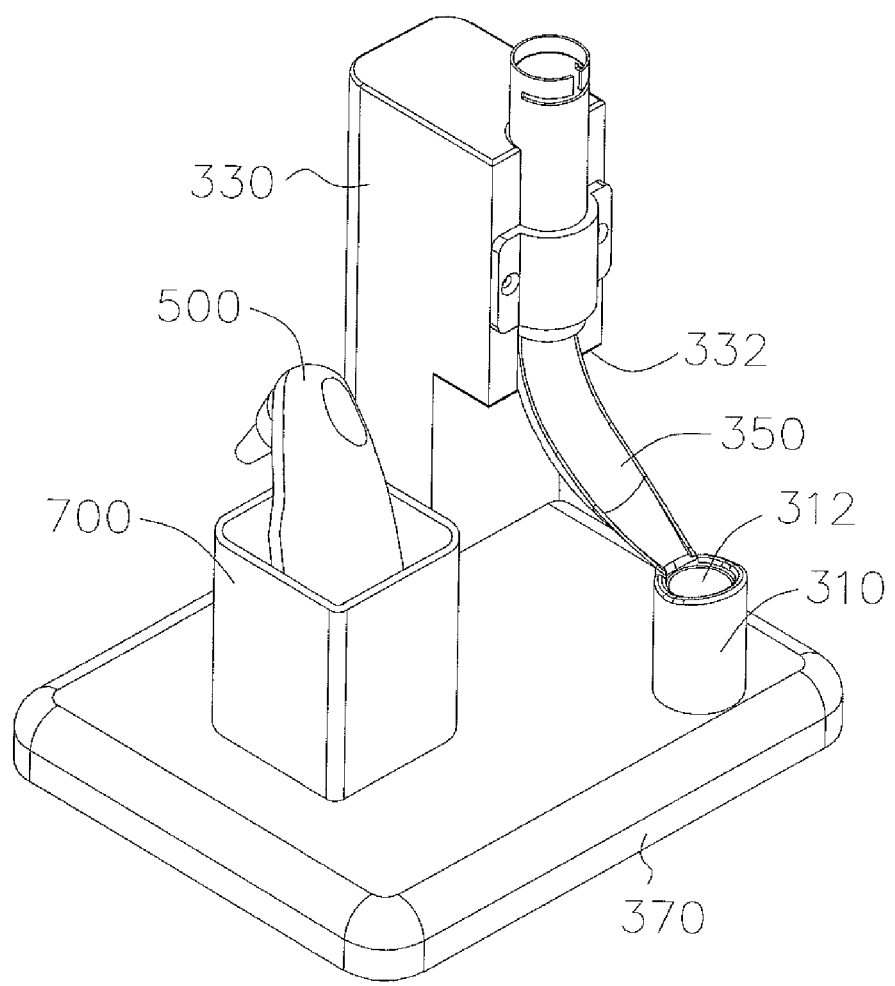
FIGS. 3-5 are schematic illustrations of a probe cover dispenser according to an exemplary embodiment of the present invention.
Figure 4:
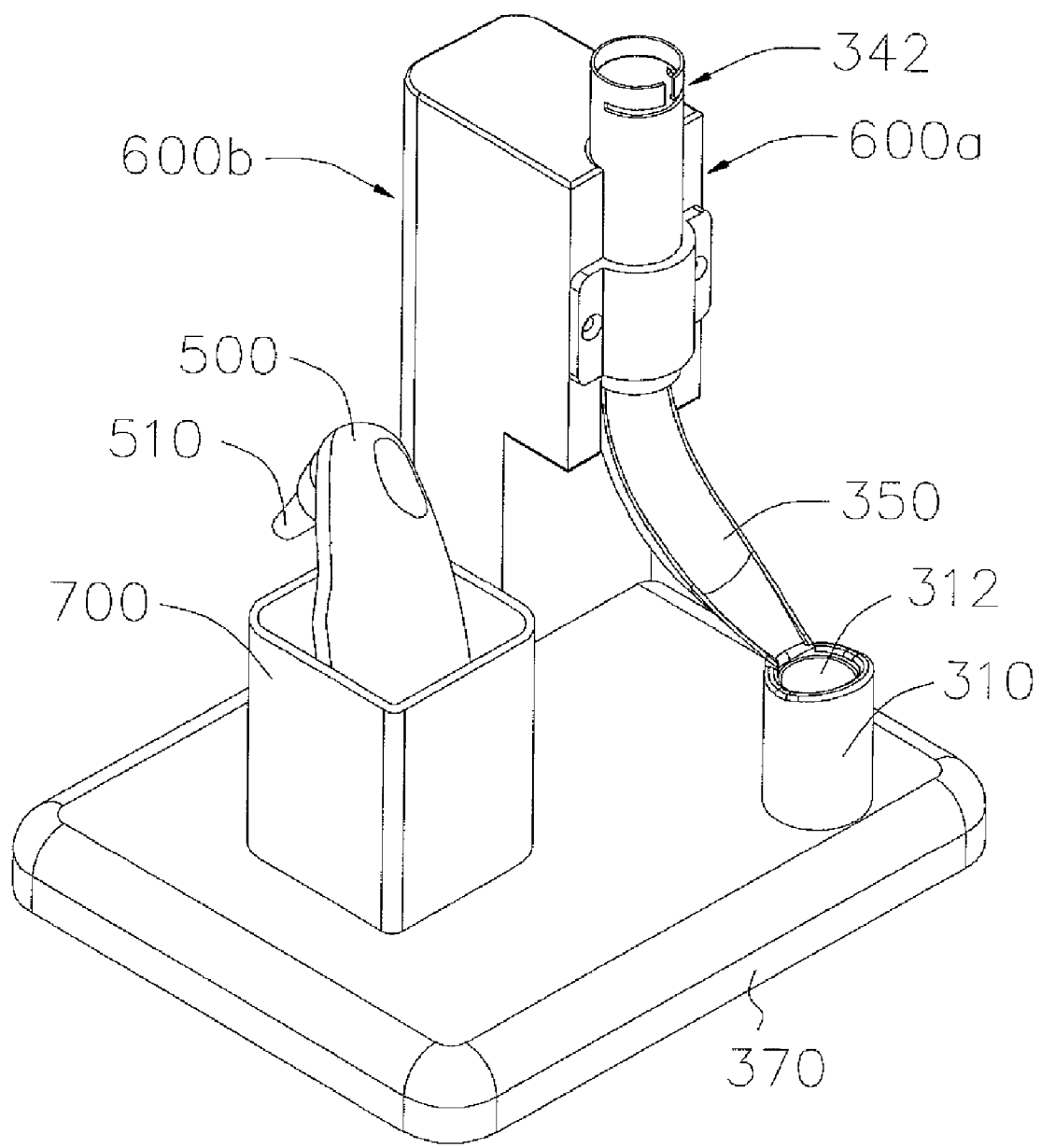
Figure 5:
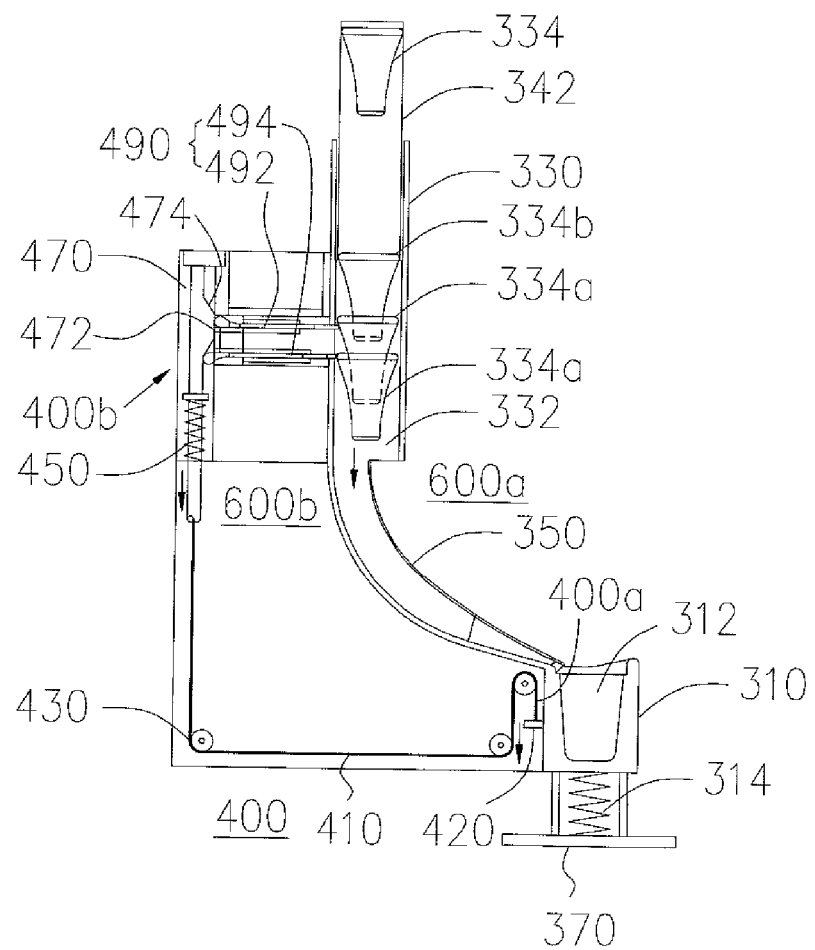

Referring to FIGS. 3-5, an exemplary embodiment of a probe cover dispenser 300 includes a bottom base 370 with a work platform. A container 700 on the work platform can be employed to accommodate an ear thermometer 500. Further, the bottom base 370 generally designs a space to accommodate a buffer member 314 and/or a portion of a linking member 400 as shown in FIG. 5.

A slidable access member 310 with a first opening 312 to accommodate a probe cover is disposed on a first position of the bottom base 370. A storage member 330 with a second opening 332 thereunder disposed on a second position of the bottom base 370 accommodates stacked probe covers 334.

A retaining member 490 holds one of the stacked probe covers such as probe cover 334a. A linking member 400 having a first linking end 400a to connect the slidable access member 310 and a second linking end 400b to connect the retaining member 490. Specifically, vertically movement of the slidable access member 310 can induce linking member 400 for driving retaining member 490 to release the one of the stacked probe covers 334a and cause it to fall into the first opening 312 from the second opening 332 and/or hold a further one of the stacked probe covers 334b in the storage member 330.

The first opening 312 may be disposed under the second opening 332 or have a distance from the second opening 332. In this case, a slide channel 350 is disposed between the first opening 312 and the second opening 332 and thus the one of the stacked probe cover 334a can fall into the first opening 31 by way of the slide channel 350.

In one example, a buffer member 314 can be disposed between the slidable access member 310 and the bottom base 370 to allow the slidable access member 310 to move upwardly and downwardly. In general, the buffer member 314 may be a spring for connecting the slidable access member 310 and the bottom base 370 to form a buffer space.

As shown in FIG. 5, retaining member 490 may include an upper retaining unit 492 and a lower retaining unit 494 and Stacked probe covers includes a first probe cover 334a and a second probe cover 334b. Specifically, downward movement of the slidable access member 310 can induce linking member 400 for driving upper retaining unit 492 to release the first probe cover 334a and driving the lower retaining unit 494 to hold the falling first probe cover 334a. And upward movement of the slidable access member 310 can induce linking member 400 for continuously driving lower retaining unit 494 to release the first probe cover 334a and driving the upper retaining unit 492 to hold a further second probe cover 334b while the slidable access member 310 go back to the original position. The first probe cover 334a then falls into the first opening 312.

In one example arrangement, a control button 420 is located on the side spacer plate of the slidable access member 310. Pressing the control button 420 can move the slidable access member 310 downwardly and the slidable access member 310 can be back the original position by the buffer member 314 while the control button 420 is released.

In one embodiment, the user may directly insert the probe of an ear thermometer 500 into opening 312 of the slidable access member 310. The user then pushes the probe downwardly into probe cover 334a to allow the user to very rapidly cover probe with the probe cover 334a by a single hand without having to ever touch or otherwise contact the outer probe cover surface. The slidable access member 310 can be back the original position by the buffer member 314 while the probe is lifted out. Further, the second probe cover 334b will fall into the opening 312.

FIG. 5 shows a further embodiment of a linking member 400 provided in accordance with the present invention. The linking member 400 may be a pulley system including wheels 430 each that has a groove between two flanges around its circumference. A cable 410 usually runs over the wheel 430 and inside the groove. Pulleys are used to change the direction of an applied force. For example, a linking rod 470 with a buffer member 450 such as a spring structure, is designed to connect the cable 430. The downward movement of the slidable access member 310 can pull the cable 430 and cause the linking rod 470 to be moved downwardly. Thereafter, the linking rod 470 will go back to its original position through the buffer member 450 while the slidable access member 310 is released.

In one example, the linking rod 470 includes a protrusion portion 472 and a recess portion 474. The downward movement of the linking rod 470 can move the recess portion 474 to a position corresponding to the upper retaining unit 492 causing the upper retaining unit 492 being pulled back and then releasing the first probe cover 334a. At the same time, the downward movement of the linking rod 470 can move the protrusion portion 472 to a position corresponding to the lower retaining unit 494 causing the lower retaining unit 494 being pushed out and then holding the first probe cover 334a. On the contrary, the upward movement of the linking rod 470 can move the recess portion 474 to a position corresponding to the lower retaining unit 494 causing the lower retaining unit 494 being pulled back and then releasing the first probe cover 334a. At the same time, the upward movement of the linking rod 470 can move the protrusion portion 472 to a position corresponding to the upper retaining unit 492 causing the upper retaining unit 492 being pushed out and then holding the second probe cover 334b.

Figure 8:
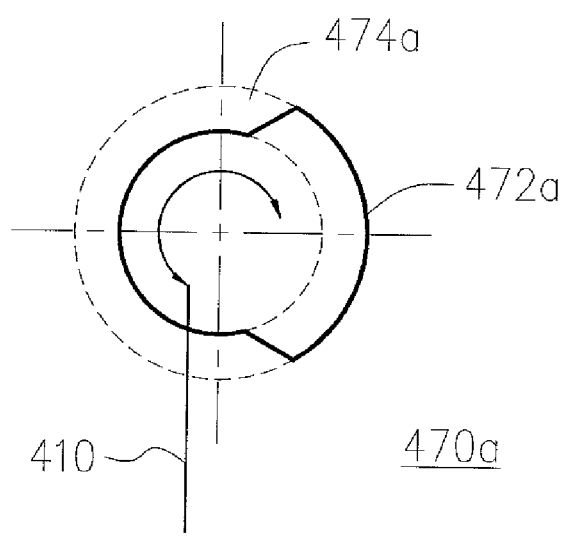
FIG. 8 shows examples of alternate preferred embodiment of a retaining member.

FIG. 8 shows a further embodiment of linking rod 470 provided in accordance with the present invention. The linking rod 470 may be a camshaft 470a including a protrusion portion 472a and a recess portion 474a. The protrusion portion 472a and the recess portion 474a can be moved to the positions corresponding to the upper retaining unit 492 and the lower retaining unit 494 while rotational movement of the camshaft 470a is induced by pulling cable 410.

Figure 6A:
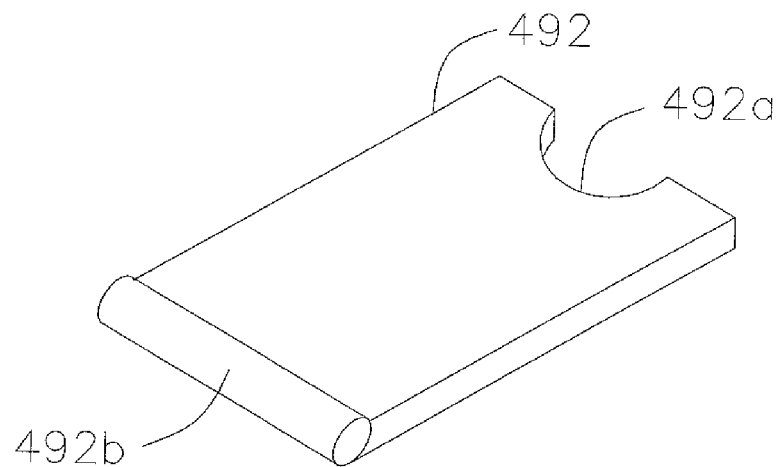
FIG. 6A-6B shows examples of preferred embodiment of a retaining member.
Figure 6B:
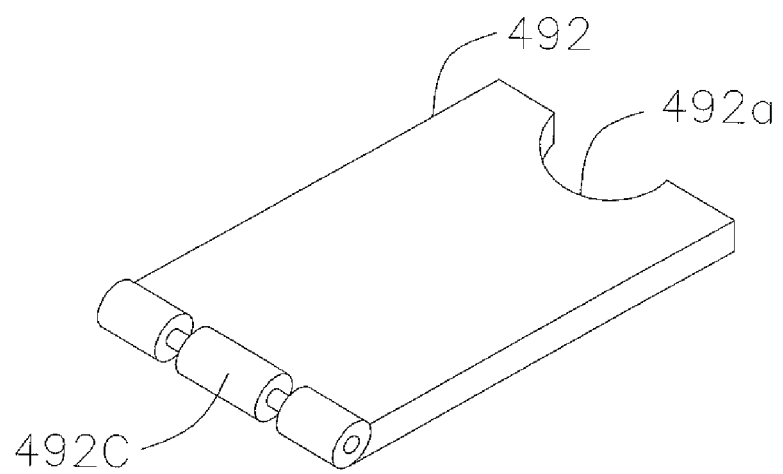

FIG. 6A-6B show further embodiments of retaining member 490 provided in accordance with the present invention. The upper retaining unit 492 and the lower retaining unit 494 each may include a slide body with a first end having a recess portion 492a for holding a falling probe cover and a second end having a smooth portion 492b for contacting the movable linking rod 470. In one example, the second end of the retaining unit has a rotatable shaft 492c to reduce the friction force while contacting the movable linking rod 470.

Figure 7A:
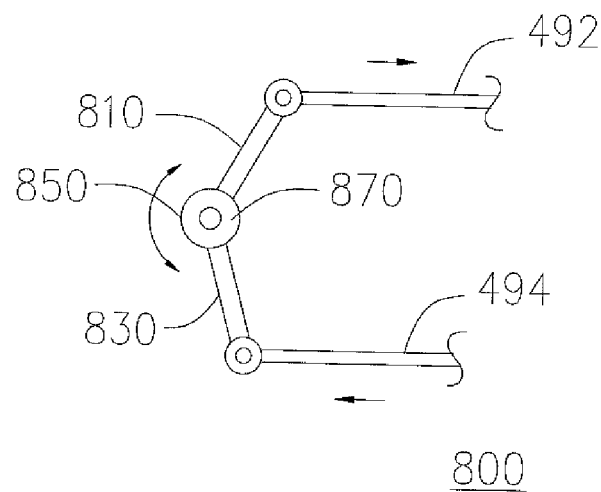
FIG. 7A-7B shows examples of alternate preferred embodiment of a retaining member.
Figure 7B:
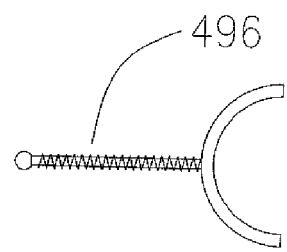

FIG. 7A-7B show further embodiments of linking rod 800 provided in accordance with the present invention. In one example, the linking rod 800 includes an upper lateral rod 810 for connecting the upper retaining unit 492 and a lower lateral rod 830 for connecting the lower retaining unit 494. A shaft 850 linking the upper lateral rod 810 and the lower lateral rod 830 can be rotated by pulling the cable and cause the upper lateral rod 810 and the lower lateral rod 830 to be alternatively pulled back or pushed out. The shaft 850 can go back to its original position by way of circular spring 870 while the pulling force of the cable is disappeared. In one example, the upper retaining unit 492 and the lower retaining unit 494 can be a rod structure 496 with a recess portion for holding the probe cover. Specifically, a buffer member can be designed to surround the rod structure 496.

FIGS. 9A-9E show further embodiments of linking rod and retaining units provided in accordance with the present invention. In one example, a linking rod 960 with a buffer member 450 as shown in FIG. 5 such as a spring structure, is designed to use a rod 962 to connect the cable 410. The downward movement of the slidable access member 310 can pull down the cable 410 and cause the linking rod 960 to be moved downwardly. Thereafter, the linking rod 960 will go back to its original position through an elastic force of the buffer member 450 while the slidable access member 310 is released to its original position.

Figure 9A:
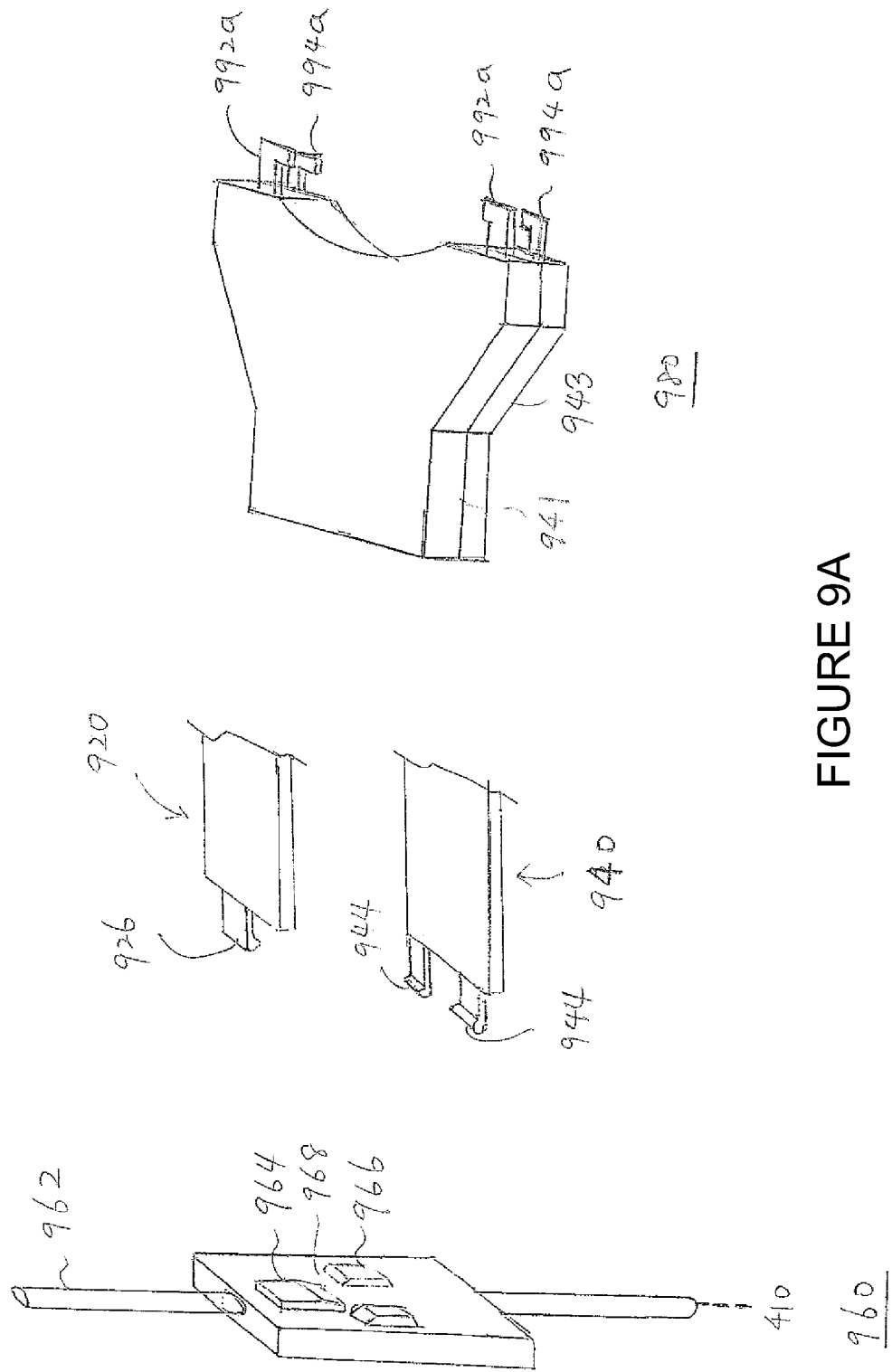
FIGS. 9A-9E show further embodiments of linking rod and retaining units provided in accordance with the present invention.
Figure 9B:
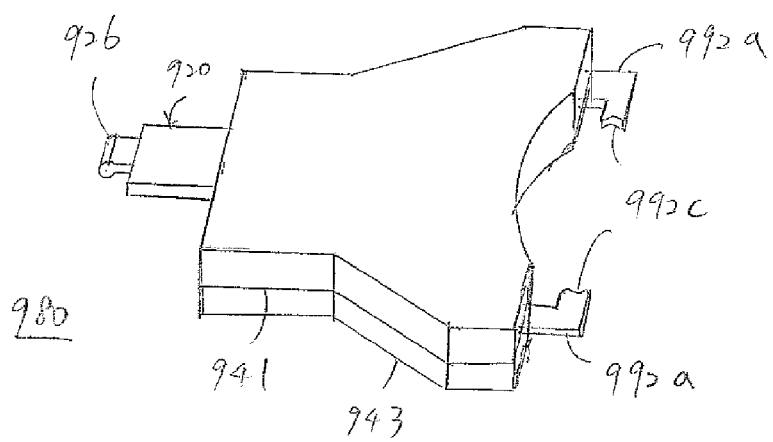
Figure 9C:
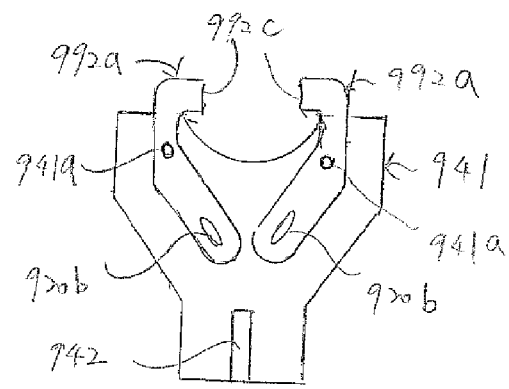
Figure 9C:
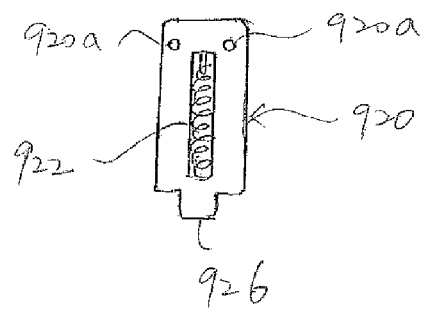

Referring to FIGS. 9A-9C, an upper retaining unit 992a is disposed on a spacer plate 941 of a container 980. Specifically, the upper retaining unit 992a comprises a pair of holes for insertion of a pair of locating pins 941a on the spacer plate 941. The upper retaining unit 992a further comprises a pair of supporting arms 992c on the front end thereof.

On the other hand, an upper slide 920 connecting the rear end of the upper retaining unit 992a is movable along the spacer plate 941 in the container 980. Specifically, the upper retaining unit 992a comprises a pair of slits 920b for insertion of a pair of locating pins 920a on the upper slide 920 to form an upper Y-shaped linking structure. A pair of upper supporting arms 992c is laterally inwardly extended from the frond end of the upper retaining unit 992a.

The upper slide 920 may further comprise a space for insertion of a buffer member 922 such as a spring. The buffer member 922 can be moved into a trench 942 of the spacer plate 941 and compressed by a front end of the trench 942 while the upper slide 920 is moved toward the front end of the container 980.

As shown in FIG. 9A, the linking rod 960 includes an upper protrusion portion 964 and a recess portion 968 under the upper protrusion portion 964. The downward movement of the linking rod 960 leads to a movement of the protrusion portion 964 to a position corresponding to an extension portion 926 of the upper slide 920 and thus applied a force to push the upper slide 920. The upper slide 920 is then moved to push the upper retaining unit 992a forward and causes the supporting arms 992c to be laterally outwardly moved to release an upper one of the stacked probe cover. On the contrary, the upward movement of the linking rod 960 can move the recess portion 968 to a position corresponding to the extension portion 926 of the upper slide 920 causing the upper retaining unit 992a being pulled back and then the supporting arms 992c is laterally inwardly moved to hold another one of the stacked probe cover.

Specifically, the upper slide 920 is forwardly or backwardly moved to apply a force to push or pull the upper retaining unit 992a such that the pair of upper supporting arms 992c is laterally outwardly moved to release the upper one of the stacked probe covers and cause it to fall into a lower supporting arms 994a from the upper supporting arms 992a or laterally inwardly moved to hold the upper one of the stacked probe covers, while the slidable access member 310 is moved upwardly or downwardly.

Figure 9D:
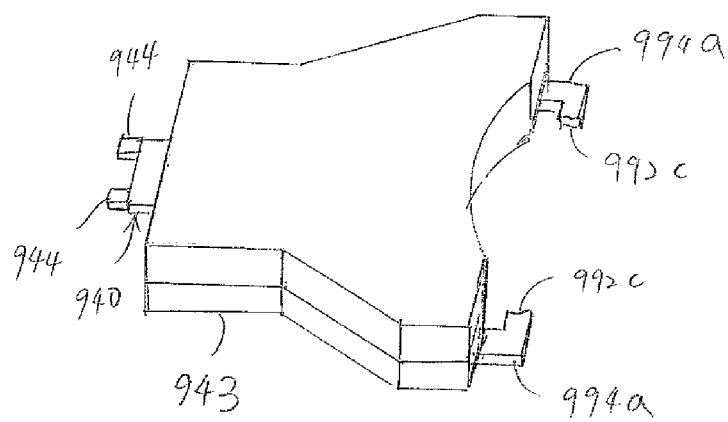
Figure 9E:
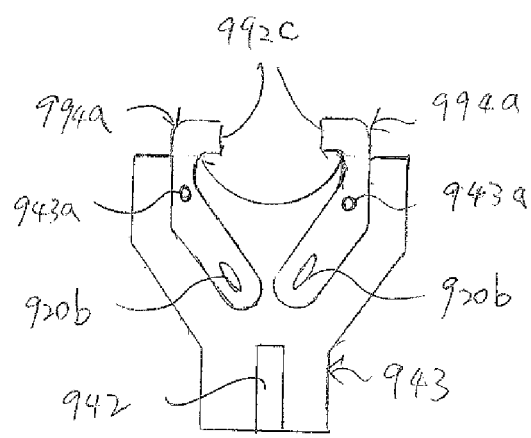
Figure 9E:
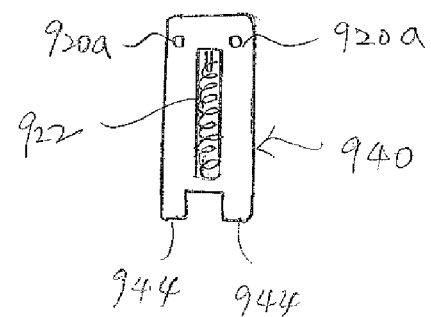

Referring to FIG. 9A and FIGS. 9D-9E, a lower retaining unit 994a is disposed on a bottom plate 943 of the container 980. Specifically, the lower retaining unit 992a comprises a pair of holes for insertion of a pair of locating pins 943a on the bottom plate 943. The lower retaining unit 994a further comprises a pair of supporting arms 992c on the front end thereof.

On the other hand, a lower slide 940 connecting the rear end of the lower retaining unit 994a is movable along the bottom plate 943 in the container 980. Specifically, the lower retaining unit 994a comprises a pair of slits 920b for insertion of a pair of locating pins 920a on the lower slide 940 to form a lower Y-shaped linking structure. A pair of upper supporting arms 992c is laterally inwardly extended from the frond end of the lower retaining unit 994a.

The lower slide 940 may further comprise a space for insertion of a buffer member 922 such as a spring. The buffer member 922 can be moved into a trench 942 of the bottom plate 943 and compressed by a front end of the trench 942 while the lower slide 940 is moved toward the front end of the container 980.

As shown in FIG. 9A, the linking rod 960 includes a lower protrusion portion 966 and a recess portion 968 above the lower protrusion portion 966. The upward movement of the linking rod 960 leads to a movement of the protrusion portion 966 to a position corresponding to an extension portion 944 of the lower slide 940 and thus applied a force to push the lower slide 940. The lower slide 940 is then moved to push the lower retaining unit 994a forward and causes the supporting arms 992c to be laterally outwardly moved to release a lower one of the stacked probe cover. On the contrary, the downward movement of the linking rod 960 can move the recess portion 968 to a position corresponding to the extension portion 944 of the lower slide 940 causing the lower retaining unit 994a being pulled back and then the supporting arms 992c is laterally inwardly moved to hold the lower one of the stacked probe cover.

Specifically, the lower slide 940 is forwardly or backwardly moved to apply a force to push or pull the lower retaining unit 994a such that the pair of lower supporting arms 992c is laterally outwardly moved to release the lower one of the stacked probe covers and cause it to fall into the first opening 312 from the second opening 332 as shown in FIG. 5 or laterally inwardly moved to hold the lower one of the stacked probe covers, while the slidable access member 310 is moved upwardly or downwardly.

Referring to FIG. 5 again, the storage member 330 may further include a pluggable tube 342 with a lower opening for accommodating stacked probe covers 334 which are not exposed. The pluggable tube 342 can be easily removed while the tube is empty. In general, the storage member 330 includes a first space 600a for insertion of the pluggable tube 342 and a second space 600b adjacent the first space 600a for accommodating the retaining member 490 and linking member 400.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A probe cover dispenser, comprising:
    a storage member for accommodating stacked probe covers;
    an upper retaining unit with a pair of upper supporting arms for holding or releasing an upper one of the stacked probe covers;
    an upper slide, connecting the upper retaining unit;
    a linking rod with an upper protrusion portion and a recess portion under the upper protrusion, connecting the slidable access member; wherein the linking rod is moved upwardly or downwardly and the upper protrusion portion or the recess portion is moved to a position corresponding to the upper slide such that a force is applied to push the upper supporting arms of the upper retaining unit to release the upper one of the stacked probe covers or hold the upper one of the stacked probe covers in the storage member;
    a slidable access member with a first opening for accessing probe covers and the storage member with a second opening for accommodating the stacked probe covers;
    a lower retaining unit with a pair of lower supporting arms for holding or releasing a lower one of the stacked probe covers;
    a lower slide, connecting the lower retaining unit;
    wherein the linking rod comprising a lower protrusion portion under the recess portion is moved upwardly or downwardly and the lower protrusion portion or the recess portion is moved to a position corresponding to the lower slide such that a force is applied to push or pull the lower supporting arms of the lower retaining unit to release the lower one of the stacked probe covers and cause it to fall into the first opening from the second opening or hold the lower one of the stacked probe covers in the storage member, while the slidable access member is moved upwardly or downwardly.

2. The probe cover dispenser as recited in claim 1 further comprising a slide channel between the first opening and the second opening, wherein the lower one of the stacked probe covers falls into the first opening from the second opening through the slide channel.

3. The probe cover dispenser as recited in claim 2, further comprising a first spring located under the slidable access member.

4. The probe cover dispenser as recited in claim 3, wherein the upper slide and the lower slide are movable along a spacer plate and a bottom plate disposed in a container.

5. The probe cover dispenser as recited in claim 4, wherein the upper slide and the lower slide connect the upper retaining unit and the lower retaining unit through a pair of locating pins to form an upper Y-shaped linking structure and a lower Y-shaped linking structure.

6. The probe cover dispenser as recited in claim 5, further comprising a second spring connecting an end of the linking rod for linking the slidable access member.

7. A probe cover dispenser, comprising:
a slidable access member with a first opening for accessing probe covers;
a storage member with a second opening for accommodating stacked probe covers;
a retaining unit with a pair of supporting arms for holding or releasing one of the stacked probe covers;
a slide connecting the retaining unit;
a linking rod with a protrusion portion and a recess portion connecting the slidable access member, wherein the linking rod is moved upwardly or downwardly and the protrusion portion or the recess portion is moved to a position corresponding to the slide such that a force is applied to push the supporting arms to release or hold the one of the stacked probe covers in the storage member, while the slidable access member is moved upwardly or downwardly.

8. A probe cover dispenser, comprising:
a slidable access member with a first opening for accessing probe covers;
a storage member with a second opening for accommodating stacked probe covers;
an upper retaining unit with a pair of upper supporting arms for holding or releasing an upper one of the stacked probe covers;
an upper slide, connecting the upper retaining unit;
a lower retaining unit with a pair of lower supporting arms for holding or releasing a lower one of the stacked probe covers;
a lower slide, connecting the lower retaining unit;
a linking rod with an upper protrusion portion, a lower protrusion portion and a recess portion therebetween, connecting the slidable access member; wherein the linking rod is moved upwardly and the recess portion is moved to a position corresponding to the upper slide such that a force is applied to pull the upper supporting arms to hold the upper one of the stacked probe covers in the storage member, and the lower protrusion portion is moved to a position corresponding to the lower slide such that a force is applied to push the lower supporting arms to release the lower one of the stacked probe covers and cause it to fall into the first opening from the second opening, while the slidable access member is moved upwardly to its original position.

9. The probe cover dispenser as recited in claim 8, wherein the linking rod is moved downwardly and the upper protrusion is moved to a position corresponding to the upper slide such that a force is applied to push the upper supporting arms to release the upper one of the stacked probe covers in the storage member, and the recess portion is moved to a position corresponding to the lower slide such that a force is applied to pull the lower supporting arms to hold the fallen upper one of the stacked probe covers, while the slidable access member is moved downwardly.

* * * * *